United States Patent
Mori et al.

(10) Patent No.: US 7,813,329 B2
(45) Date of Patent: Oct. 12, 2010

(54) BASE STATION, AND A SCRAMBLING CODE SETTING METHOD

(75) Inventors: Shinichi Mori, Yokosuka (JP); Ichiro Okajima, Gyoda (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 405 days.

(21) Appl. No.: 11/270,606

(22) Filed: Nov. 10, 2005

(65) Prior Publication Data
US 2006/0121907 A1    Jun. 8, 2006

(30) Foreign Application Priority Data
Nov. 12, 2004    (JP) .............................. 2004-329360

(51) Int. Cl.
*H04B 7/216*    (2006.01)
(52) U.S. Cl. .................. 370/342; 370/343; 370/335; 370/329
(58) Field of Classification Search .................. 370/335, 370/342, 328, 338, 343, 329
See application file for complete search history.

(56) References Cited
U.S. PATENT DOCUMENTS
2003/0103478 A1 *    6/2003    Eriksson .................... 370/335
2005/0099972 A1 *    5/2005    Motegi et al. ............... 370/328

FOREIGN PATENT DOCUMENTS
| EP | 0 851 611 A2 | 7/1998 |
| EP | 0 989 686 A2 | 3/2000 |
| JP | 2001-054158 | * 2/2001 |
| JP | 2002-218528 | 8/2002 |

OTHER PUBLICATIONS
European Search Report, Jun. 7, 2010 in European Apllication No. 05256982.9.

* cited by examiner

*Primary Examiner*—Ajit Patel
*Assistant Examiner*—Khai M Nguyen
(74) *Attorney, Agent, or Firm*—Oblon, Spivak, McClelland, Maier & Neustadt, L.L.P.

(57) ABSTRACT

A base station and a scrambling code setting method of automatically setting up a scrambling code, the base station including a scrambling code setting unit for setting up a base station identifier and a provisional downlink scrambling code that is provisionally assigned; and a transmitting unit for spectrum-spreading the base station identifier by the provisional scrambling code, and for transmitting the base station identifier; wherein the scrambling code setting unit assigns a lasting downlink scrambling code based on a report concerning reception of the base station identifier.

5 Claims, 14 Drawing Sheets

FIG.5

ADJACENT CELL LIST OF EXISTING BASE STATION 100₁

| PRIORITY | Sc | BS_ID |
|---|---|---|
| 1 | Sc#a | BSid#a |
| 2 | Sc#b | BSid#b |
| ... | ... | ... |
| N#1 | Sc#1 | BSid#1 |

ADJACENT CELL LIST OF EXISTING BASE STATION 100₂

| PRIORITY | Sc | BS_ID |
|---|---|---|
| 1 | Sc#3 | BSid#3 |
| 2 | Sc#c | BSid#c |
| ... | ... | ... |
| N#2 | Sc#2 | BSid#2 |

ADJACENT CELL LIST OF EXISTING BASE STATION 100₃

| PRIORITY | Sc | BS_ID |
|---|---|---|
| 1 | Sc#2 | BSid#2 |
| 2 | Sc#d | BSid#d |
| ... | ... | ... |
| N#3 | Sc#3 | BSid#3 |

ADJACENT CELL LIST OF NEWLY INSTALLED BASE STATION 100₄

| PRIORITY | Sc | BS_ID |
|---|---|---|
| 1 | Sc#tmp | BSid#new |

FIG.7B

MEASUREMENT REPORT
TO EXISTING STATION
$100_1$ FROM $MS300_1$
Sc#tmp    BSid#new
......

MEASUREMENT REPORT
TO EXISTING STATION
$100_2$ FROM $MS300_2$
Sc#tmp    BSid#new
......

MEASUREMENT REPORT
TO EXISTING STATION
$100_3$ FROM $MS300_3$
Sc#tmp    BSid#new
......

BASE STATION REMOVED

BASE STATION, AND A SCRAMBLING CODE SETTING METHOD

BACKGROUND OF THE INVENTION

1. Field of the Invention

The present invention relates to a base station, and a scrambling code setting method for a CDMA cellular system, using a code division multiple access method, wherein a user shares the same frequency band with other users.

2. Description of the Related Art

In a communication system, wherein two or more communication waves share the same frequency band using the code division multiple access method, each communication wave is distinguished by a spread code that is a random code sequence. System efficiency is the higher, if a detection property (autocorrelation property) and a discernment property between different spread codes (cross-correlation property) are the better. For this reason, not all the random code sequences available by sequence length are used, but only random code sequences that have a necessary property are used. Accordingly, when high system efficiency is required, the number of spread codes that are available for assignment becomes smaller than the number of communication waves that a communication system assumes as being simultaneously required.

Especially, for the spread codes that are used by downlinks of a wideband CDMA cellular system, sign orthogonality is required in addition to the high detection and discernment properties so that high quality communications are realized at low transmission power by reducing mutual interference between the spread codes that are different. For this reason, the number of spread codes that can be assigned to the downlink becomes further smaller than to an uplink. These few spread codes are repeatedly used by all the cells for effective usage, with a cell-unique code being superimposed in order to prevent interference between the cells.

In the wideband CDMA cellular system, spread codes that actually spread user data are called channelization codes, and codes that are superimposed by each cell for cell interference prevention are called scrambling codes.

The number of the scrambling codes for distinguishing a cell is not infinite, either. The number is specified as 512 for the wideband CDMA cellular system. Accordingly, in order to prevent interference, it is necessary to select the scrambling codes such that the same code is not repeatedly used in a short distance. Conventionally, scrambling codes are manually selected by a radio network designer so that the same scrambling code is not assigned to base stations that are close to each other. Specifically, a radio wave reaching area of each base station is estimated using a computer into which positions of the base stations, and equipment and antenna configuration are entered, and the scrambling codes are assigned such that the same code is not assigned to base stations, the radio wave reaching areas of which overlap. For this reason, when a new base station is to be installed, the radio network designer has to perform this set up process again.

Further, when scrambling codes are assigned based on computer simulation, an error can arise in actual operations, which causes interference. In this case, it is necessary to perform setting up again, further consuming great time and effort of the radio network designer and an on-site surveyor.

In order to solve the problem described above, a method of automatically assigning a scrambling code for a downlink of a base station is disclosed (for example, Patent Reference 1). According to this method, first, a base station of a wideband CDMA cellular system receives a downlink signal of an adjacent base station, identifies its control channel, and performs decoding such that the scrambling code already used by the downlink of the adjacent base station is identified. Then, based on the result, a control unit of the base station automatically determines a downlink scrambling code to be used by the base station.

This method is characterized in that the base station receives the downlink of the adjacent base station. Accordingly, the base station includes a filter for receiving the downlink frequency band, a decoding unit, and a processing unit for identifying the control channel of the downlink, and for detecting a scrambling code and a channelization code. Then, the base station sets up a scrambling code, the number of which is higher than the scrambling code used by the adjacent base station. In this way, assigning the same scrambling code to two adjacent base stations is avoided.

[Patent reference 1] JPA 2002-218528

DESCRIPTION OF THE INVENTION

Problem(s) to be Solved by the Invention

However, there are the following problems in the background technology described above.

According to the conventional method of automatically determining the scrambling code for downlink of the base station, there is a problem in that the base station has to be equipped with a receiver and the filter for identifying the downlink control channel transmitted from the adjacent base station. Specifically, the base station includes a receiver; however, the receiver is for receiving an uplink frequency, which usually is apart from a downlink frequency by dozens of MHz. For this reason, an oscillator, an amplifier, a receiving filter, etc., for receiving the downlink of the adjacent base station are additionally required, so that the size of the receiver needs to be increased.

Further, since there are differences between the uplink and the downlink in, e.g., the frame structure of a control channel, the multiplexing methods of the in-phase channel (Ich) and the orthogonal channel (Qch), and the scrambling codes used, there is a problem in that the size of the base station apparatus and/or software needs to be increased.

Further, the downlink of the base station powerfully interferes with the downlink from the adjacent base station, so that a receiving antenna needs to be installed separately from a transmitting antenna for sufficient isolation, posing another problem in that the size of an antenna system needs to be increased.

Further, according to the conventional method of automatically determining the scrambling code for downlink of the base station, there is a problem in that an adjacent cell list (neighbor list) is not taken into consideration, the neighbor list having a close relationship with setting up a scrambling code.

A control channel of each base station transmits an adjacent cell list that is a list of scrambling codes used by adjacent base stations so that a mobile station can swiftly detect cells. When assigning a downlink scrambling code to a certain base station, downlink scrambling codes used by adjacent base stations should be avoided; and not only that, but also, scrambling codes listed in the adjacent cell lists should be avoided. This is to avoid a mobile station that belongs to an adjacent cell receiving the same scrambling code from two base stations. Otherwise, the mobile station cannot properly distinguish between the two stations having different station identifiers and the same scrambling code.

Another problem with the conventional method of automatically determining the scrambling code is that, when removing a base station, a release process of releasing the scrambling code of the removed base station, and an updating method of the adjacent cell lists are not included. Therefore, conventionally, the adjacent cell lists are not updated when a base station is removed, which unduly degrades the speed of cell detection by mobile stations.

SUMMARY OF THE INVENTION

In a preferred embodiment of the present invention is provided a base station and a scrambling code setting method for automatically setting up a scrambling code that a base station should use, substantially obviating one or more of the problems caused by the limitations and disadvantages of the related art.

Features of the present invention are set forth in the description that follows, and in part will become apparent from the description and the accompanying drawings, or may be learned by practice of the invention according to the teachings provided in the description. Problem solutions provided by the present invention will be realized and attained by a base station, and a scrambling code setting method particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a base station, and a scrambling code setting method as follows.

Means for Solving the Problem

The present invention provides a base station of a mobile communications system wherein the same frequency band is shared by mobile stations that belong to two or more adjacent cells, and base stations that form the adjacent cells. In order to solve the problems described above, the base station includes a scrambling code setting unit for setting up a base station identifier and a provisional downlink scrambling code that is provisionally assigned, a transmitting unit for transmitting the base station identifier that is spectrum-spread by the provisional scrambling code, wherein the scrambling code setting unit determines a lasting downlink scrambling code based on a reception report of the base station identifier.

In this way, a scrambling code that will not cause interference to/from the adjacent cell can be appropriately and automatically set up.

Another aspect of the present invention provides a scrambling code setting method for a mobile communications system wherein mobile stations that belong to two or more adjacent cells and base stations that form the adjacent cells communicate by sharing the same frequency band. The scrambling code setting method includes a step of setting up a base station identifier, and a provisional downlink scrambling code that is provisionally assigned, a step of transmitting the base station identifier that is spectrum-spread by the provisional downlink scrambling code, a step of determining a lasting scrambling code based on a reception report of the base station identifier, and a step of setting up the determined scrambling code.

In this way, the scrambling code that will not cause interference to/from the adjacent cell can be appropriately and automatically set up.

Effect of the Invention

As described above, according to an aspect of the present invention, the base station and the scrambling code setting method that are capable of automatically setting up the scrambling code to be used by the base station are realized.

BRIEF DESCRIPTION OF THE DRAWINGS

FIG. 5 gives lists showing adjacent cell lists of base stations at an initial state of the base station being newly installed;

FIG. 7B shows information reported from mobile station to base station;

DESCRIPTION OF THE PREFERRED EMBODIMENTS

In the following, embodiments of the present invention are described with reference to the accompanying drawings.

Here, as for all the drawings for explaining the embodiments, units, items, and the like that have the same functions are referenced to by the same reference numbers, and the explanations thereof are not repeated.

Figure 1:
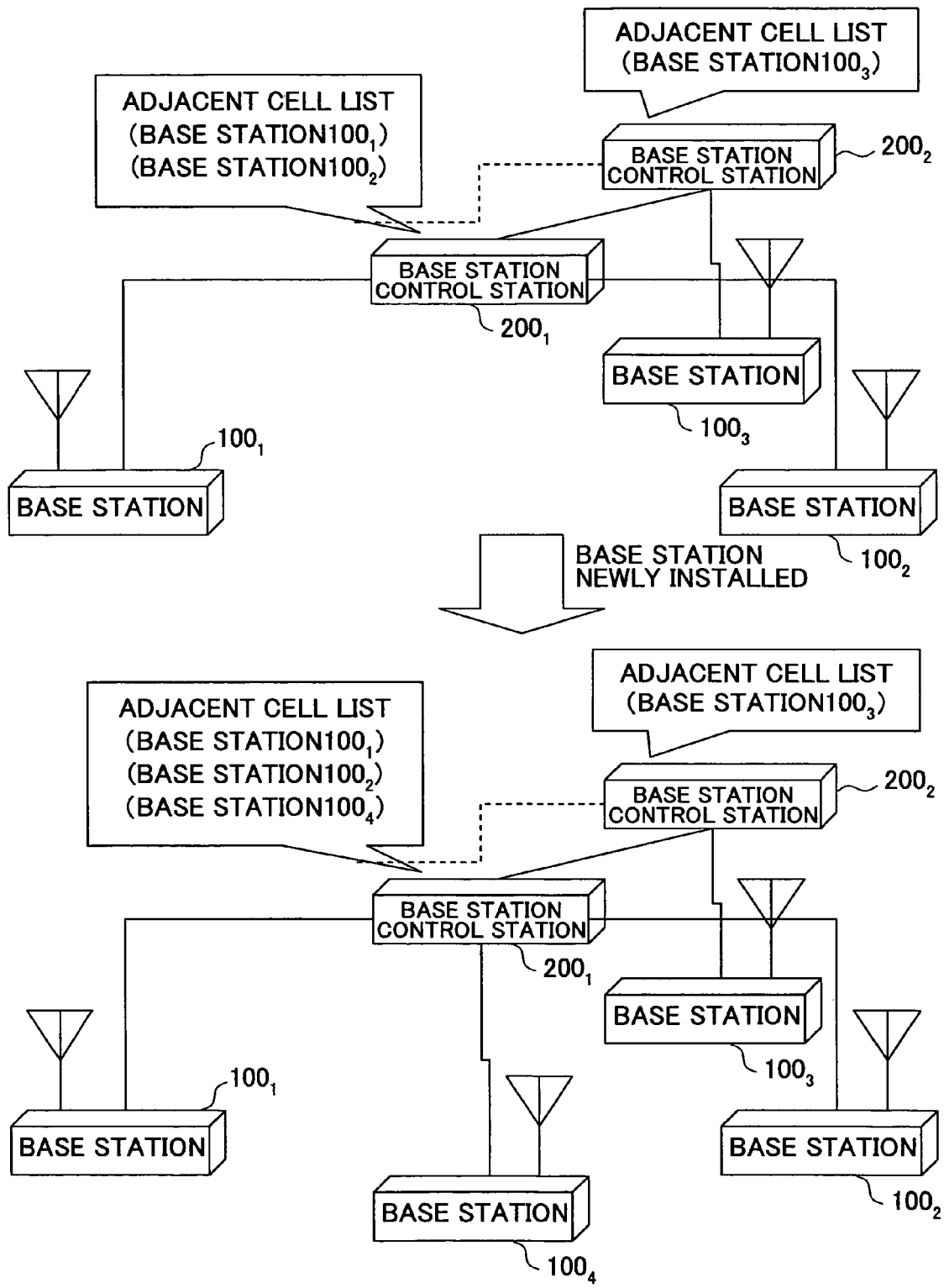
FIG. 1 is a block diagram showing the structure of a radio access network wherein a base station according to an embodiment of the present invention is newly installed.

An example of the structure of a radio access network according to the embodiment of the present invention is described with reference to FIG. 1.

The radio access network of the embodiment is a CDMA (Code Division Multiple Access) cellular system, wherein mobile stations that belong to adjacent cells and base stations that constitute the adjacent cells communicate by sharing the same frequency band. The radio access network includes base stations 100 and base station control stations 200. Specifically, the radio access network includes, e.g., base stations $100_1$ through $100_3$ and base station control stations $200_1$ and $200_2$, wherein different scrambling codes and different adjacent cell lists are assigned to each base station. Further, the radio access network according to the embodiment assumes a FDD (frequency division duplex) method and a TDD (Time division duplex) method of CDMA.

Each of the base stations $100_1$, $100_2$, and $100_3$ is accommodated (controlled) by either of the base station control stations $200_1$ and $200_2$. In the example shown by FIG. 1, the base stations $100_1$ and $100_2$ are accommodated by the base station control station $200_1$, and the base station $100_3$ is accommodated by the base station control station $200_2$ in the beginning as shown by the top half of FIG. 1. Then, a base station $100_4$ is newly installed under the control of the base station control station $200_1$ as shown by the bottom half of FIG. 1.

The base station control stations $200_1$ and $200_2$ are mutually connected either by a base station control station network or a higher ranking exchange (not illustrated) for accommodating base station control stations. Further, each of the base station control stations 200 holds adjacent cell lists of the base stations that the base station control station 200 accommodates, the adjacent cell lists being available for mutual referencing. Further, a server and the like are provided for managing items that require uniqueness in the system, such as base station identifiers, and reference can be made to the server from a base station control station.

Figure 2:
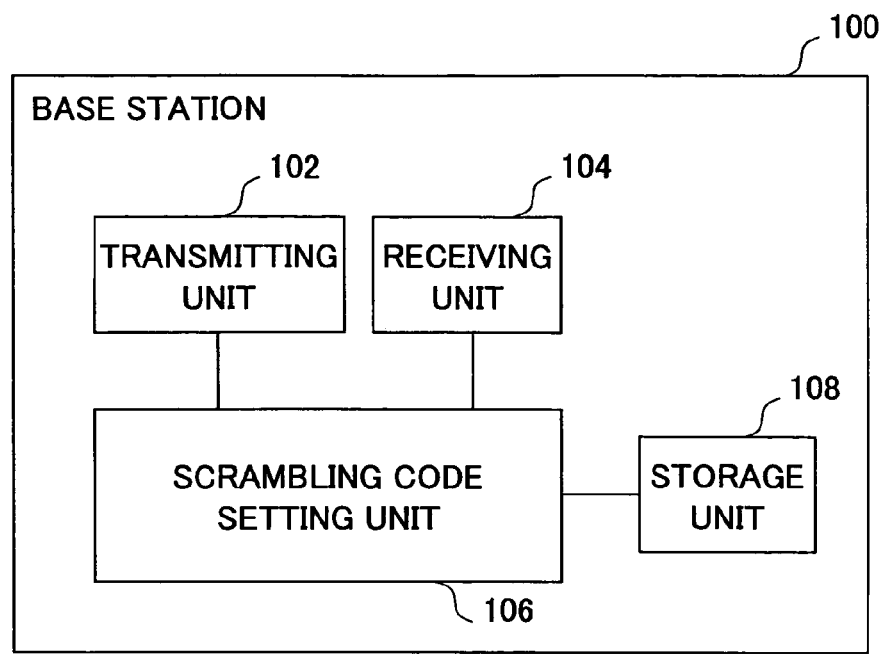
FIG. 2 is a block diagram showing the structure of the base station according to the embodiment of the present invention.

Next, the structure of the base station 100 is described with reference to FIG. 2.

The base station 100 according to the embodiment includes a transmitting unit 102, a receiving unit 104, a scrambling code setting unit 106 connected to the transmitting unit 102 and the receiving unit 104, and a storage unit 108 connected to the scrambling code setting unit 106.

A base station identifier and a provisional downlink scrambling code transmitted by the base station control station 200 are received by the receiving unit 104, the provisional downlink scrambling code being provisionally assigned to a base station to be newly installed, and the provisional scrambling code is set up for use by the scrambling code setting unit 106. The transmitting unit 102 starts transmitting the base station identifier using a control channel, which base station identifier is spectrum-spread by the provisional scrambling code. Further, at a later stage, the base station control station 200 transmits a lasting downlink scrambling code that is received by the receiving unit 104, and the scrambling code setting unit 106 updates the provisional scrambling code with the lasting scrambling code.

Figure 3:
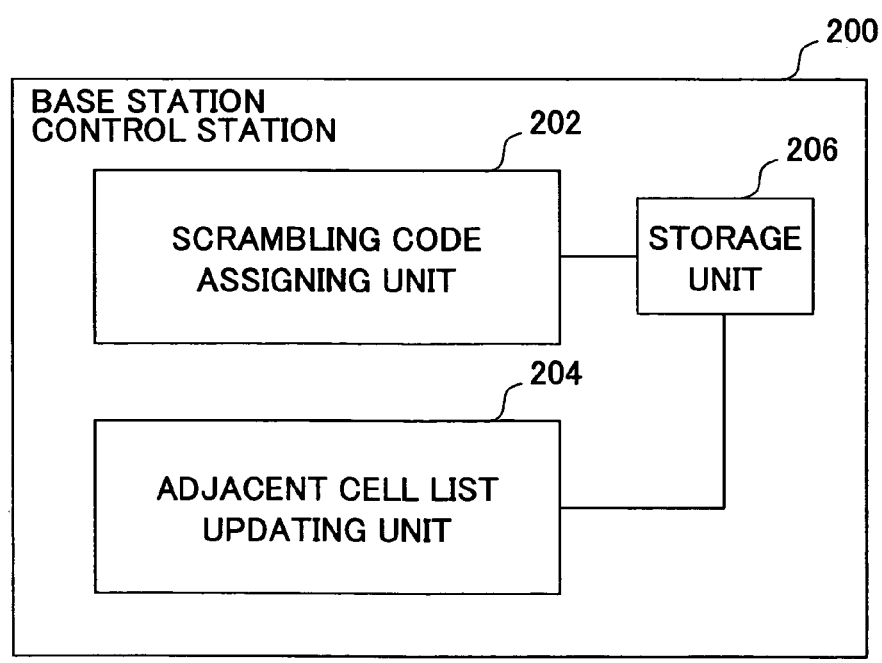
FIG. 3 is a block diagram showing the structure of a base station control station according to the embodiment of the present invention.

Next, the structure of the base station control-station 200 according to the embodiment is described with reference to FIG. 3.

The base station control station 200 according to the embodiment includes a scrambling code assigning unit 202 serving as a scrambling code setting unit, an adjacent cell list updating unit 204, and a storage unit 206 connected to the scrambling code assigning unit 202 and the adjacent cell list updating unit 204.

The scrambling code assigning unit 202 assigns a base station identifier, a provisional, and a lasting downlink scrambling code, when a base station such as the base station $100_4$ is newly installed.

The adjacent cell list updating unit 204 updates an adjacent cell list. The storage unit 206 holds the adjacent cell list.

Figure 4:
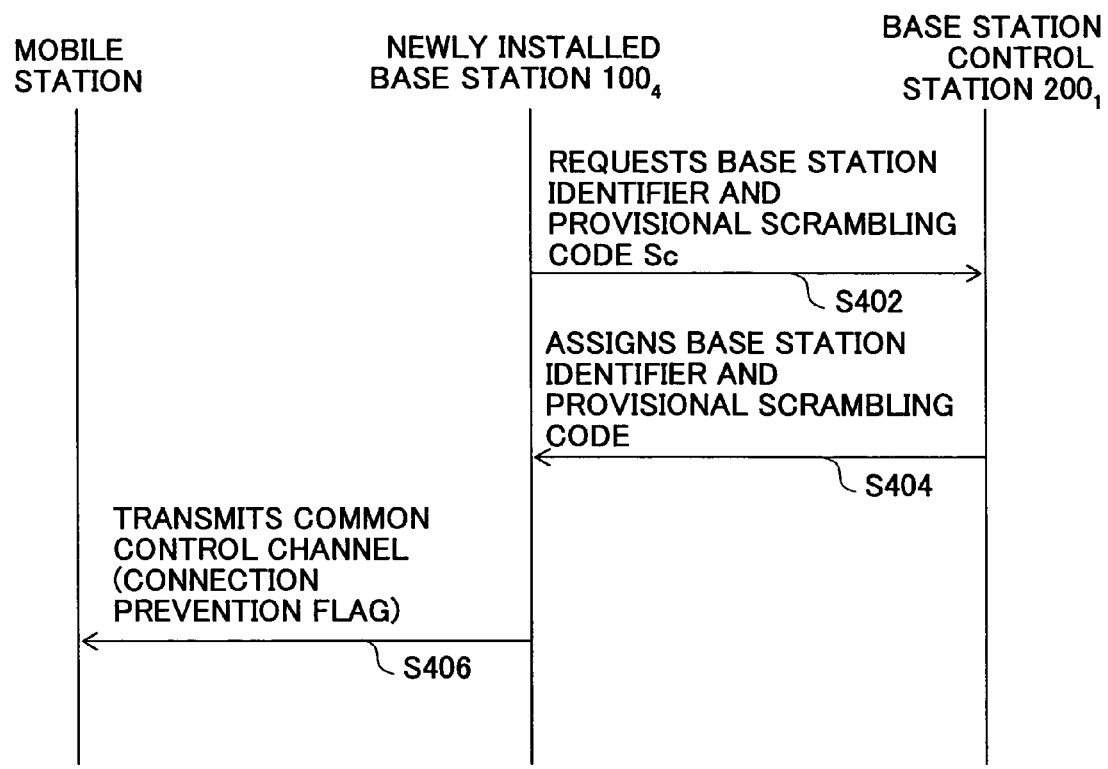
FIG. 4 is a sequence diagram showing a process when the base station according to the embodiment of the present invention is newly installed.

Next, exchanges of signals between the base station $100_4$ and the base station control station $200_1$ when the base station $100_4$ is installed are described with reference to FIG. 4.

When the base station $100_4$ is physically connected to the base station control station $200_1$, and power is turned on, the base station $100_4$ requests the base station control station $200_1$ to assign a base station identifier and a provisional scrambling code (Sc) (Step S402). The scrambling code assigning unit 202 of the base station control station $200_1$ obtains from a server a base station identifier that can be assigned, and a provisional scrambling code randomly chosen out of scrambling codes prepared for newly installed base stations by the system, and provides the base station identifier and the provisional scrambling code to the base station $100_4$ to be newly installed (Step S404). The newly installed base station $100_4$ is now able to transmit a control channel; however, a flag preventing a mobile station from connecting is transmitted by a common control channel that broadcasts system information to the cell (Step S406). In this way, the mobile station can receive the control channel of the newly installed base station $100_4$, and identify the base station identifier and the provisional scrambling code; however, a connection (originating and receiving of a call) to the newly installed base station $100_4$ is prevented.

Next, the adjacent cell list of each base station 100 is described with reference to FIG. 5. The adjacent cell list represents a state immediately after the newly installed base station $100_4$ is assigned the base station identifier and the provisional scrambling code.

An adjacent cell list is compiled for every base station, and is held by the storage unit 206 of the base station control station 200. The adjacent cell lists specify priority of adjacent base stations and contain the identifier, scrambling codes, etc., of the base stations that are adjacent to the corresponding base station concerned. The number of base stations that can be included is restricted to, e.g., 32 by the system.

Usually, the adjacent cell list is held by the base station control station 200; however, it can be held by the storage unit 108 of the base station 100.

In the adjacent cell list of the base station $100_1$, which has been in service, a base station whose scrambling code is Sc#a and base station identifier is BSid#a, and a base station whose scrambling code is Sc#b and base station identifier is BSid#b are set. Further, a scrambling code Sc#1 and a base station identifier BSid#1 that are assigned to the base station $100_1$ are included.

In the adjacent cell list of the base station $100_2$, which has been in service, a base station whose scrambling code is Sc#3 and base station identifier is BSid#3, and a base station whose scrambling code is Sc#c and base station identifier is BSid#c are set. Further, a scrambling code Sc#2 and a base station identifier BSid#2 that are assigned to the base station $100_2$ are included.

In the adjacent cell list of the base station $100_3$, which has been in service, the base station whose scrambling code is Sc#2 and base station identifier is BSid#2, and a base station whose scrambling code is Sc#d and base station identifier is BSid#d are set. Further, the scrambling code Sc#3 and the base station identifier BSid#3 of the base station $100_3$ are included.

In the adjacent cell list of the newly installed base station $100_4$, a provisional scrambling code Sc#tmp and a base station identifier BSid#new are included as the initial state.

Figure 6:
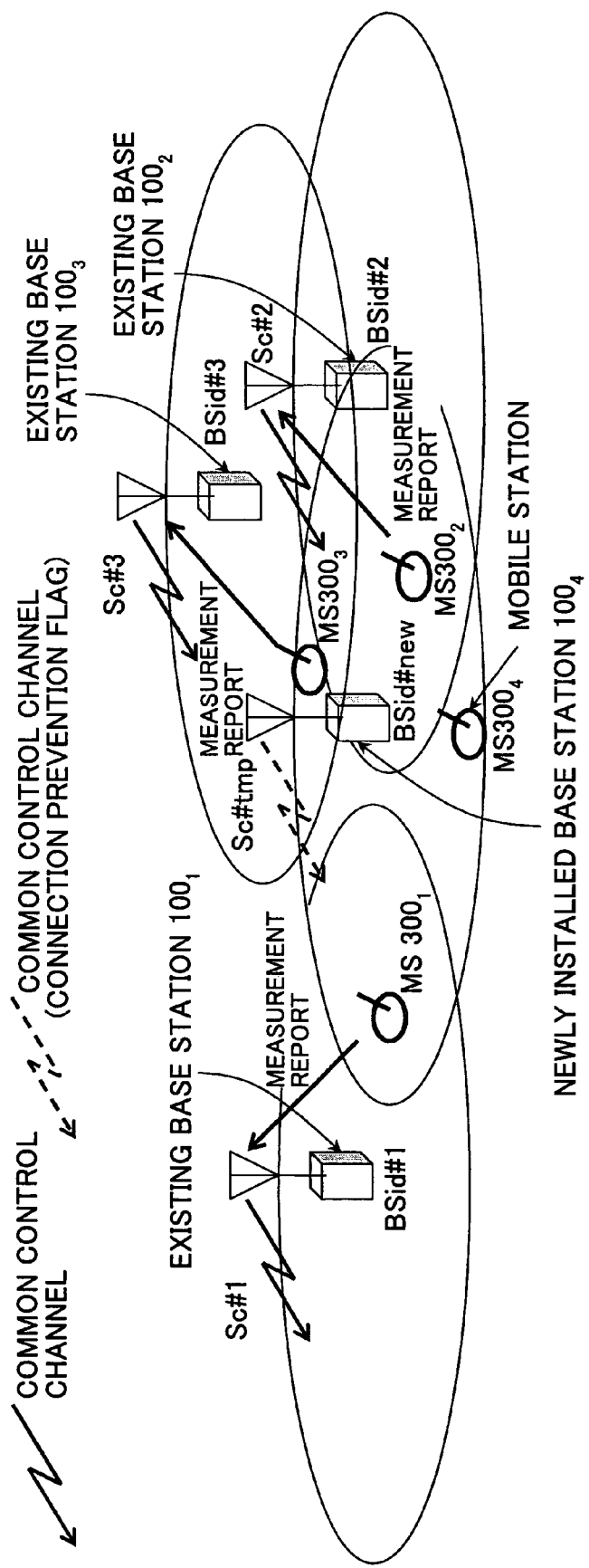
FIG. 6 is a map showing mobile stations sending measurement reports.

Next, a situation wherein-mobile stations measure the newly installed base station $100_4$, and report measurement results is described with reference to FIG. 6. Specifically, mobile stations $300_1$, $300_2$, $300_3$, and $300_4$ belong to the corresponding cells served by the base stations $100_1$, $100_2$, and $100_3$ that have been in service, which base stations are adjacent to the newly installed base station $100_4$; and the mobile stations measure the base station $100_4$ and report the measurement results.

The mobile station (MS) $300_1$ (MS$300_1$ in FIG. 6) belonging to the cell of the base station $100_1$ is located at a place where the common control channel of the newly installed base station $100_4$ can be received, and reports the base station identifier, the scrambling code, a receiving level, etc., of the newly installed base station $100_4$ to the base station $100_1$ by a usual measurement operation for detecting handover and the like.

Similarly, the mobile station (MS) $300_2$ reports a measurement result to the base station $100_2$, and the mobile station (MS) $300_3$ reports a measurement result to the base station $100_3$. Here, the mobile station (MS) $300_4$ belongs only to the newly installed base station $100_4$, therefore, a report cannot be provided to the base station $100_4$ because of the connection prevention flag. The measurement results reported by the mobile stations $300_1$, $300_2$, and $300_3$ are provided to the base station control station $200$, which is of a higher rank, through respective base stations $100$.

Thus, in this embodiment, when setting up a scrambling code to a newly installed base station, the mobile stations belonging to adjacent base stations and being adjacent to the newly installed base station, report presence of the newly installed base station to the corresponding adjacent base stations; and a scrambling code for the newly installed base station is selected based on neighbor relations obtained from the reports provided by the mobile stations to the base station control station. Further, in order to accelerate reception of the common control channel of the newly installed base station by the mobile stations, a scrambling code assignable to a newly installed base station may be beforehand set in the adjacent cell lists of the base stations.

In this way, when setting up a scrambling code of a newly installed base station, detection of base stations that have been in service forming cells adjacent to the newly installed base station can be performed as a part of the usual measurement operation of the mobile stations, which dispenses with a measurement function of the base stations which conventionally has to be provided. The method according to the embodiment of the present invention differs from a method of choosing a scrambling code by identifying scrambling codes used by adjacent base stations by detecting neighbor relations by the newly installed base station directly measuring the adjacent base stations.

Further, in the case where neighbor relations are determined based on mutual visibility between base stations, correct neighbor relations may not be acquired where cells of base stations are not adjacent in a service area even if the base stations are visible to each other, and conversely, where cells are adjacent in a service area even if the base stations are not visible to each other. In these cases, a scrambling code for a newly installed base station may not be properly carried out. However, according to the embodiment, neighbor relations are determined based on the service area by the mobile stations, and there are no such problems.

Figure 7A:
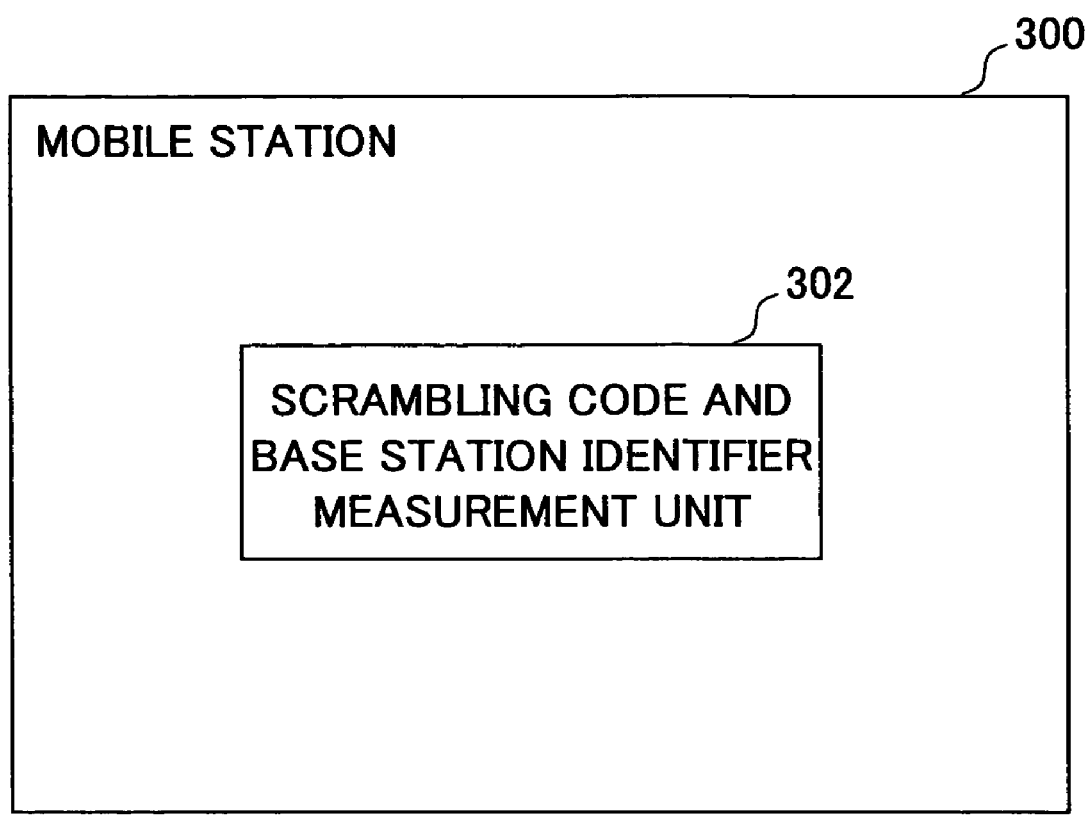
FIG. 7A is a block diagram showing the structure of a mobile station that communicates with the base station according to the embodiment of the present invention.

Next, descriptions follow about the structure of the mobile station $300$, and information (measurement report) provided to the base station $100$ from the mobile station $300$ with reference to FIGS. 7A and 7B.

The mobile station $300$ includes a scrambling code and base station identifier measurement unit $302$ as shown in FIG. 7A. The scrambling code and base station identifier measurement unit $302$ measures the base station identifier, the scrambling code, receiving level, etc., of the base station $100$, and reports them to the base station $100$.

The scrambling code and base station identifier measurement unit $302$ of the mobile station $300$ is capable of measuring two or more base stations, and reporting results of the measurements. However, for convenience of the description, the case wherein measuring and reporting concerning only the newly installed base station $100_4$ is described here.

The scrambling code and base station identifier measurement units $302$ of the mobile stations $300_1$, $300_2$, and $300_3$ transmit measurement reports to the base stations $100_1$, $100_2$ and $100_3$, respectively. The measurement reports concern the provisional scrambling code Sc#tmp and the base station identifier BSid#new of the base station $100_4$ as shown in FIG. 7B. The base stations $100_1$, $100_2$, and $100_3$ receive corresponding measurement reports, and send the measurement reports to the corresponding base station control stations $200$.

The scrambling code and base station identifier measurement unit $302$ may be configured such that it reports a receiving level, an arrival time difference of the control channel, etc., in addition to the base station identifier and the scrambling code.

When the scrambling code assigning unit $202$ of the base station control station $200$ determines that the provisional scrambling code that the system assigns to the newly installed base station is included in the measurement report transmitted from the base station $100$, the adjacent cell list of the newly installed base station is updated, and a lasting scrambling code is assigned.

Figure 8:
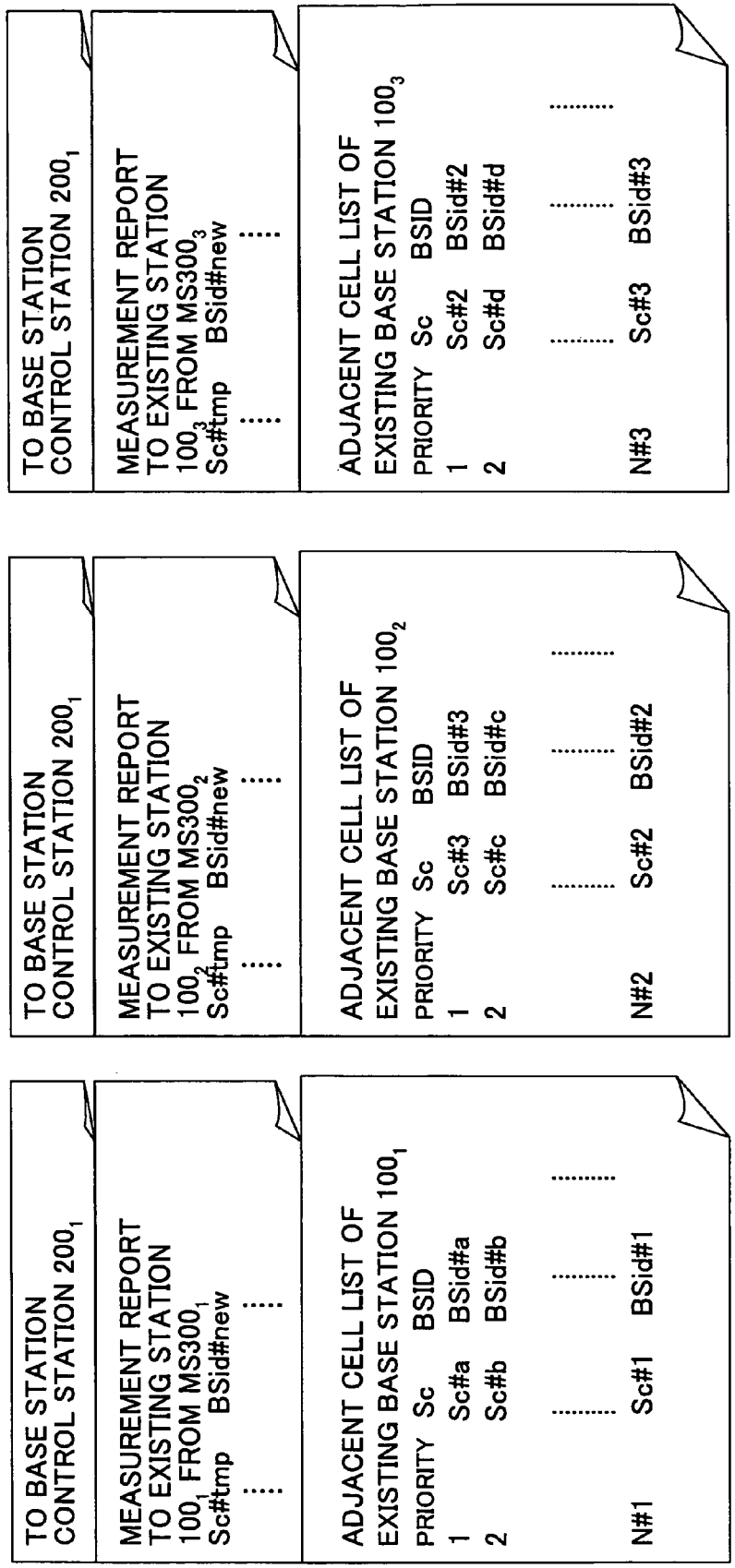
FIG. 8 shows information transmitted to a base station control station that accommodates the base station newly installed.

First, each base station control station deduces the base station control station that accommodates the newly installed base station $100_4$ from the base station identifier of the newly installed base station $100_4$, and transmits the measurement report and the adjacent cell list of a source base station to the base station control station that accommodates the newly installed base station. FIG. 8 shows an example of information that each base station control station transmits to the base station control station to which the newly installed base station belongs, for example, the base station $200_1$. The scrambling code assigning unit $202$ of the base station control station $200$, generates an adjacent cell list of the newly installed base station based on the adjacent cell lists of the adjacent base stations.

Figure 9:
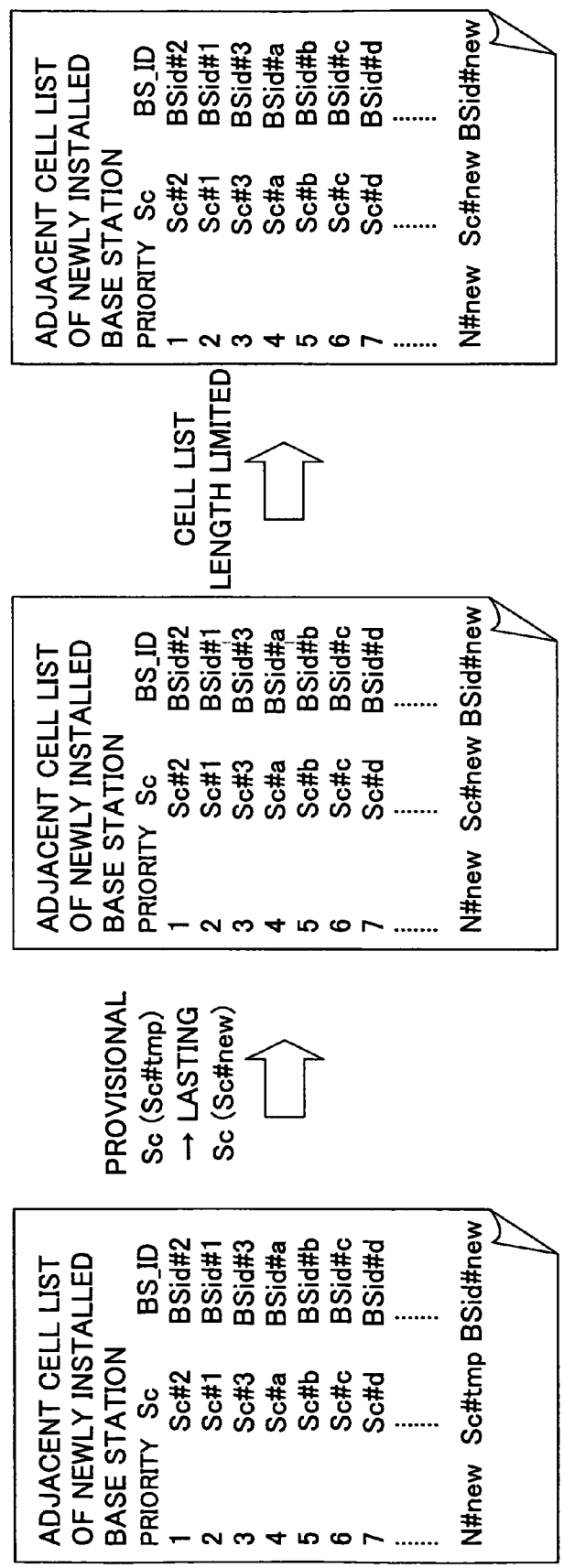
FIG. 9 is a sequence diagram showing a process of generating the adjacent cell list at the base station newly installed, and determining a scrambling code.

FIG. 9 shows the adjacent cell list of the newly installed base station $100_4$ generated by the scrambling code assigning unit $202$. The scrambling code and base station identifier of an adjacent base station that provides the adjacent cell list are listed as the most significant of the priority (i.e., the top line) of the adjacent cell list, following which, adjacent base stations indicated by the adjacent cell list of the adjacent base station are listed. Here, as for the priority, it is desirable to configure such that the more frequently reporting base station be made the higher of the priority. At the bottom of the adjacent cell list, the scrambling code and the base station identifier of the newly installed base station are inserted.

At this stage, the adjacent cell list shows all the scrambling codes that are already used by the adjacent base stations, adjacent to the newly installed base station. Accordingly, a scrambling code that is not included in the adjacent cell list is chosen, as desired, as the lasting scrambling code (Sc#new) of the newly installed base station. The scrambling code assigning unit $202$ chooses the lasting scrambling code, and provides the selected lasting scrambling code to the newly installed base station $100_4$. The scrambling code setting unit 106 of the newly installed base station $100_4$ replaces the provisional scrambling code with the lasting scrambling code.

Since the number of base stations that can be inserted to the adjacent cell list is limited, when the number of base stations, information of which is available for listing in the adjacent cell list, exceeds a predetermined number, information (Sc and BSID) of base stations with lower priority is deleted, and the scrambling code assigning unit 202 assigns one of the deleted scrambling codes as the lasting scrambling code of the newly installed base station. In this way, the lasting scrambling code and the adjacent cell list of the newly installed base station are finalized.

When the lasting scrambling code of the newly installed base station $100_4$ is determined, the adjacent cell lists of adjacent base stations are updated.

Figure 10:
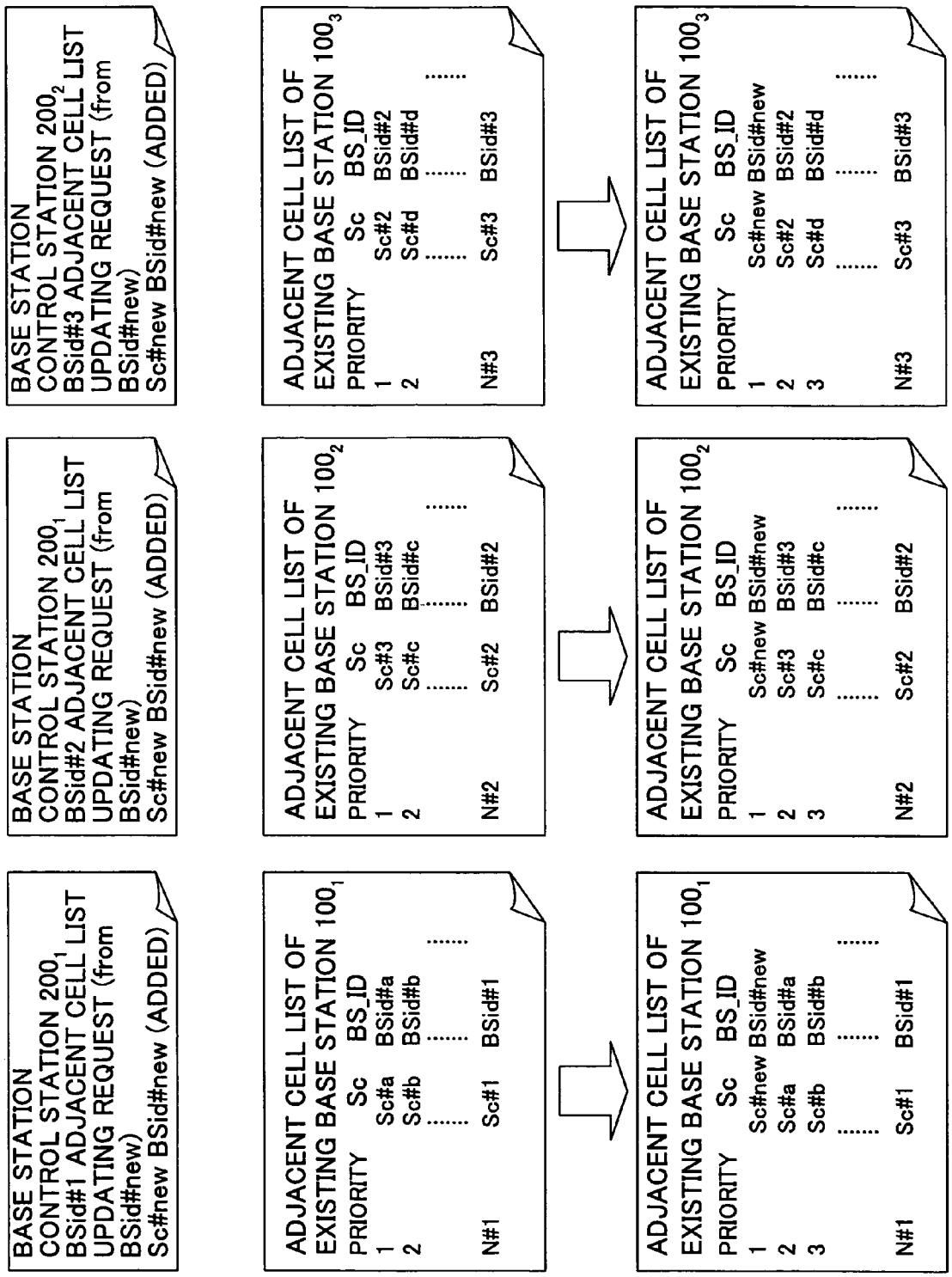
FIG. 10 is a sequence diagram showing a process of updating the adjacent cell lists carried out by base stations already installed.

The scrambling code assigning unit 202 of the base station control station $200_1$ that accommodates the newly installed base station $100_4$ communicates the scrambling code of the newly installed base station to the base station control stations $200_1$ and $200_2$ that accommodate the base stations $100_1$ through $100_3$ that have sent the measurement reports to the newly installed base station $100_4$. That is, the scrambling code assigning unit 202 transmits an adjacent cell list update request as shown in FIG. 10.

When the adjacent cell list update request is received, the adjacent cell list updating unit 204 of the base station control station 200 updates the adjacent cell list based on the adjacent cell list update request. Consequently, the scrambling code and the base station identifier of the newly installed base station are added to the adjacent cell list with, e.g., the highest priority. The adjacent cell list is held by the storage unit 206 of each base station control station 200.

By completion of the process as described above, the newly installed base station $100_4$ is ready to serve, the connection prevention flag of the common control channel is canceled such that the connection with the mobile station $300_4$ is permitted, and the newly installed base station $100_4$ becomes equivalent to other existing base stations.

As described above, according to the embodiment, a scrambling code of a newly installed base station is set up in consideration of the adjacent cell list, and the adjacent cell list is updated. When setting up the scrambling code of the newly installed base station, it is necessary not only to avoid use of the same code as existing base stations that form adjacent cells, but also to avoid use of the scrambling codes shown by the adjacent cell lists of the existing base stations. Otherwise, a possibility arises wherein the same scrambling code may be used by a cell (the second adjacent cell) that is adjacent to the adjacent cell. Since the system allows only one base station having the same scrambling code to be registered in the adjacent cell list of a base station, when the base station is located between the second adjacent cells that use the same scrambling code, one of the adjacent cells cannot be registered in the adjacent cell list. That is, the unlisted cell that cannot be considered by the system becomes a source of interference. For this reason, degradation of the system capacity and the communications quality can avoided by setting up the scrambling code in consideration of the adjacent cell list and by updating the adjacent cell list.

Figure 11:
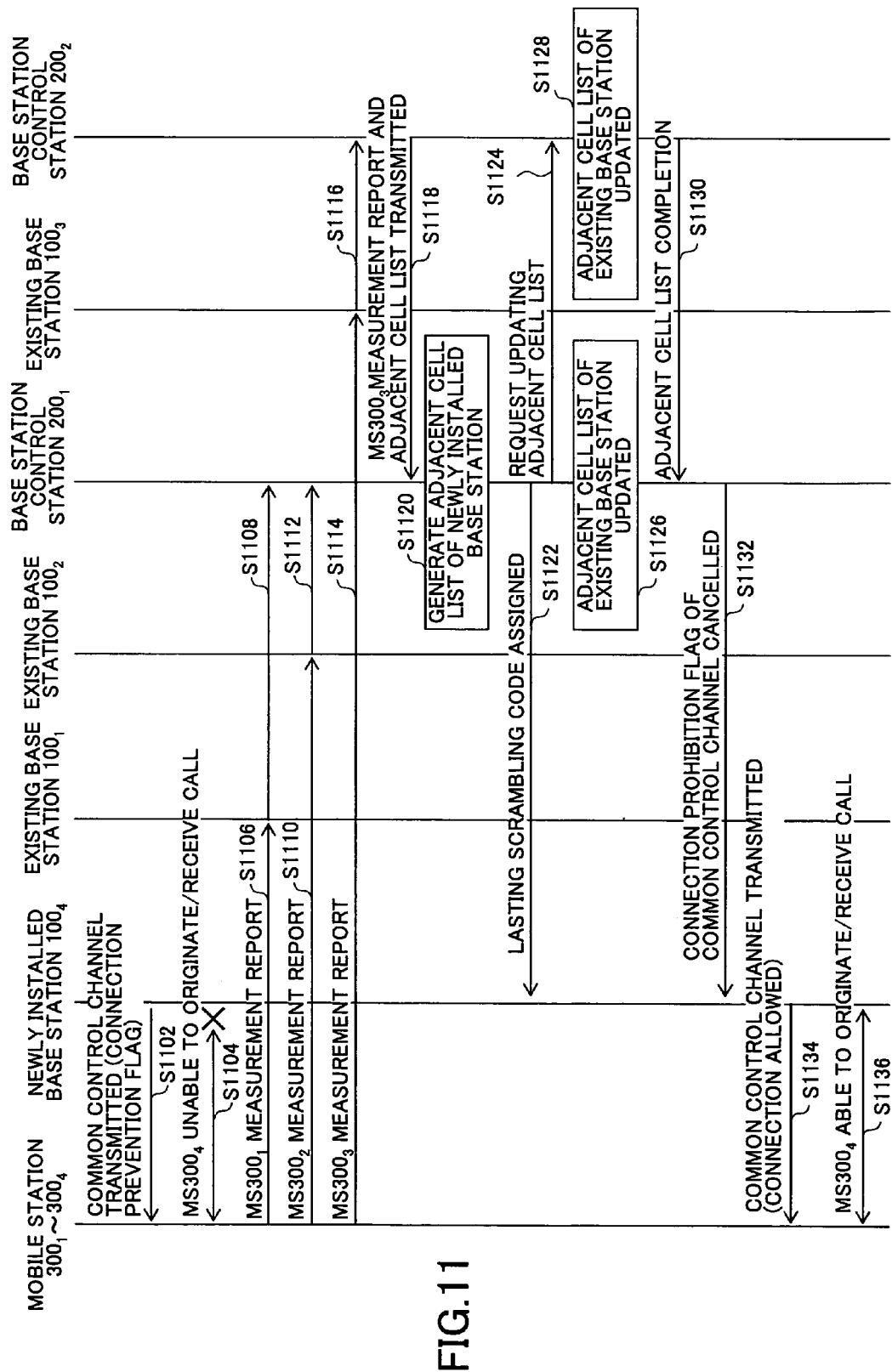
FIG. 11 is a sequence diagram showing a process of determining a scrambling code and updating the adjacent cell list.

Next, signal exchanges between the network components are described with reference to FIG. 11, the signal exchanges being in connection with a process of determining the lasting scrambling code of the newly installed base station, and a process of updating the adjacent-cell list.

The newly installed base station $100_4$ transmits the common control channel, wherein the connection prevention flag is set (Step S1102). The mobile station (MS) $300_4$ ($MS300_4$ in FIG. 11) that belongs to the cell formed by the newly installed base station $100_4$ cannot transmit/receive (Step S1104). The mobile stations $300_1$ through $300_3$ that belong to the corresponding cells of the corresponding adjacent existing base stations $100_1$ through $100_3$, respectively, and that can receive the common control channel of the newly installed base station $100_4$ identify the scrambling code and the base station identifier of the newly installed base, station $100_4$, and transmit measurement reports to the respectively belonging existing base stations $100_1$ through $100_3$ (Step S1106, Step S1110, and Step S1114, respectively). The existing base stations $100_1$ through $100_3$ transmit the measurement reports to the corresponding base station control stations 200, and $200_2$ (Step S1108, Step S1112, and Step S1116, respectively).

The base station control station $200_2$ provides the measurement report and the adjacent cell list of the source base station to the base station control station $200_1$ that accommodates the newly installed base station $100_4$ identified by the base station identifier (Step S1118).

The scrambling code assigning unit 202 of the base station control station $200_1$ generates the adjacent cell list of the newly installed base station $100_4$, and a lasting scrambling code is determined based on the adjacent cell list such that there is no duplication of the scrambling code usage (Step S1120). Then, the scrambling code assigning unit 202 provides the newly determined lasting scrambling code to the newly installed base station $100_4$ (Step S1122). The adjacent cell lists of the existing base stations $100_1$ and $100_2$ are updated with the newly determined lasting scrambling code (Step S1126).

Then, the scrambling code assigning unit 202 of the base station control station $200_1$ transmits an adjacent cell list update request to the base station control station $200_2$ (Step S1124). The base station control station $200_2$ updates the adjacent cell list of the existing base station $100_3$ (Step S1128), and communicates the completion of updating the adjacent cell list to the base station control station $200_1$ (Step S1130).

Next, the base station control station $200_1$, transmits an instruction to cancel the connection prevention flag of the common control channel to the newly installed base station $100_4$ (Step S1132). The newly installed base station $100_4$ transmits the common control channel that allows connection to the mobile station $100_4$ that belongs to the cell of the newly installed base station $100_4$ (Step S1134). Consequently, the mobile station $100_4$ that belongs to the cell of the newly installed base station $100_4$ is able to connect to the newly installed base station $100_4$ (Step S1136).

Figure 12:
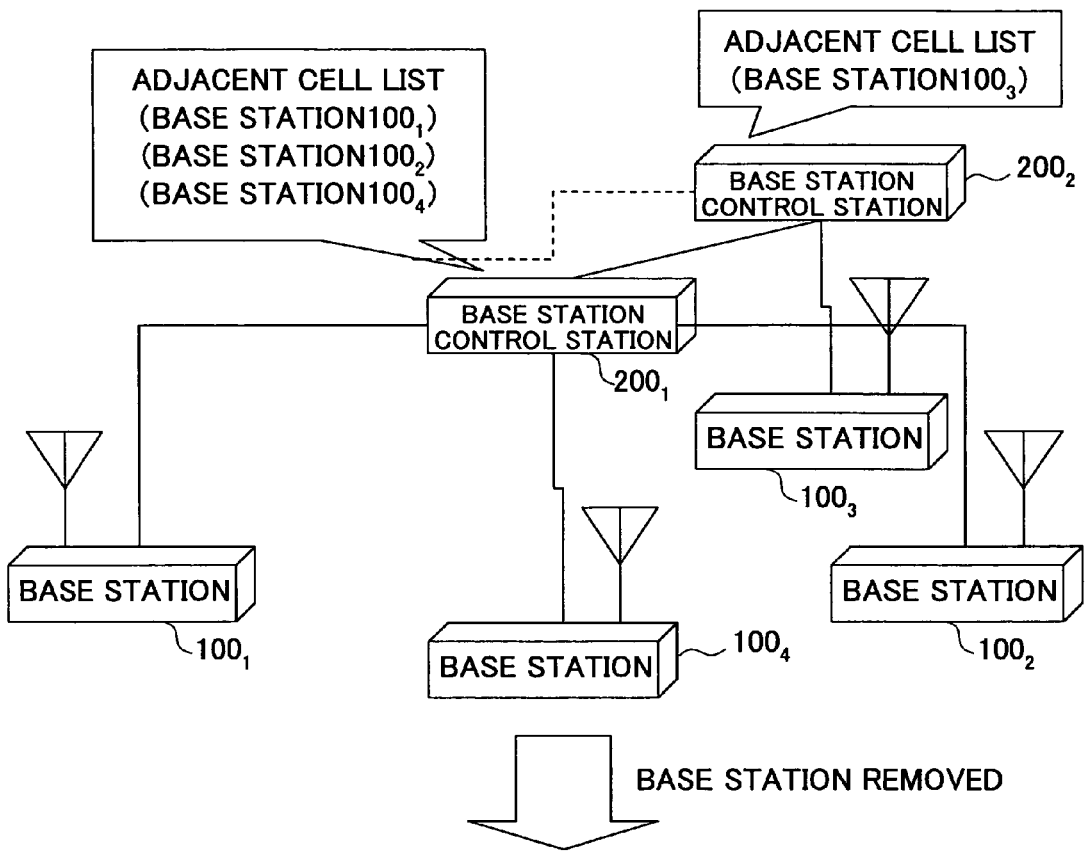
FIG. 12 is a block diagram showing the radio access network when removing a base station according to the embodiment of the present invention.
Figure 12:
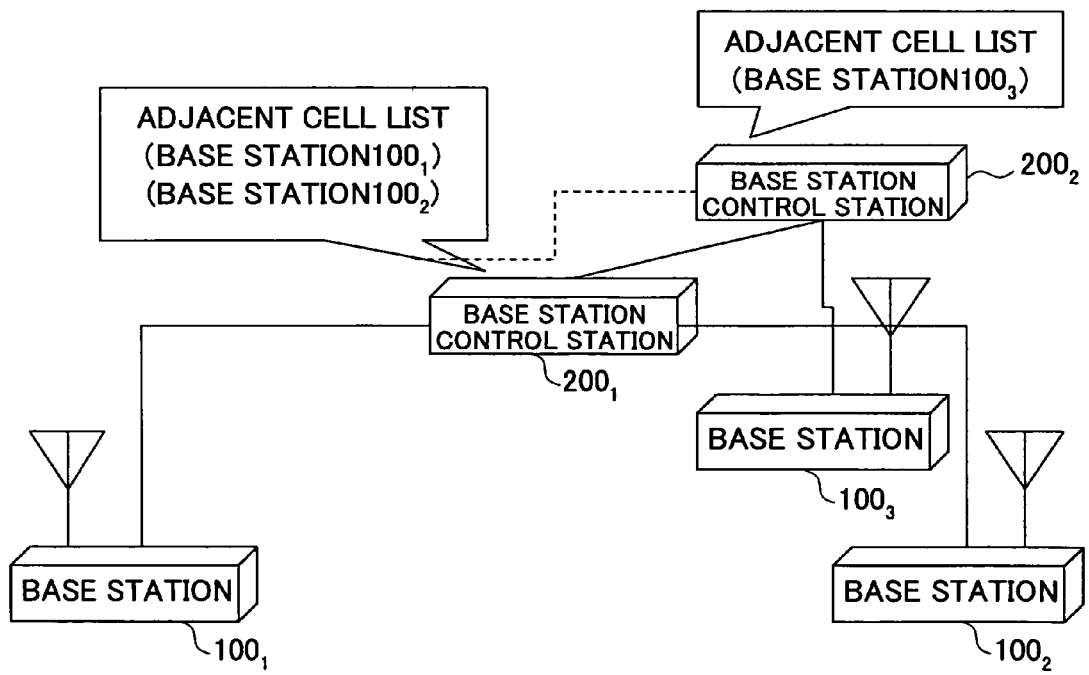

Next, the case wherein an existing base station is removed is described with reference to FIG. 12.

Suppose the base stations $100_1$, $100_2$, and $100_4$ are accommodated by the base station control station $200_1$; and the base station $100_3$ is accommodated by the base station control station $200_2$. Then, suppose the base station $100_4$ accommodated by the base station control station $200_1$ is to be removed, which base station is called the withdrawing base station.

Figure 13:
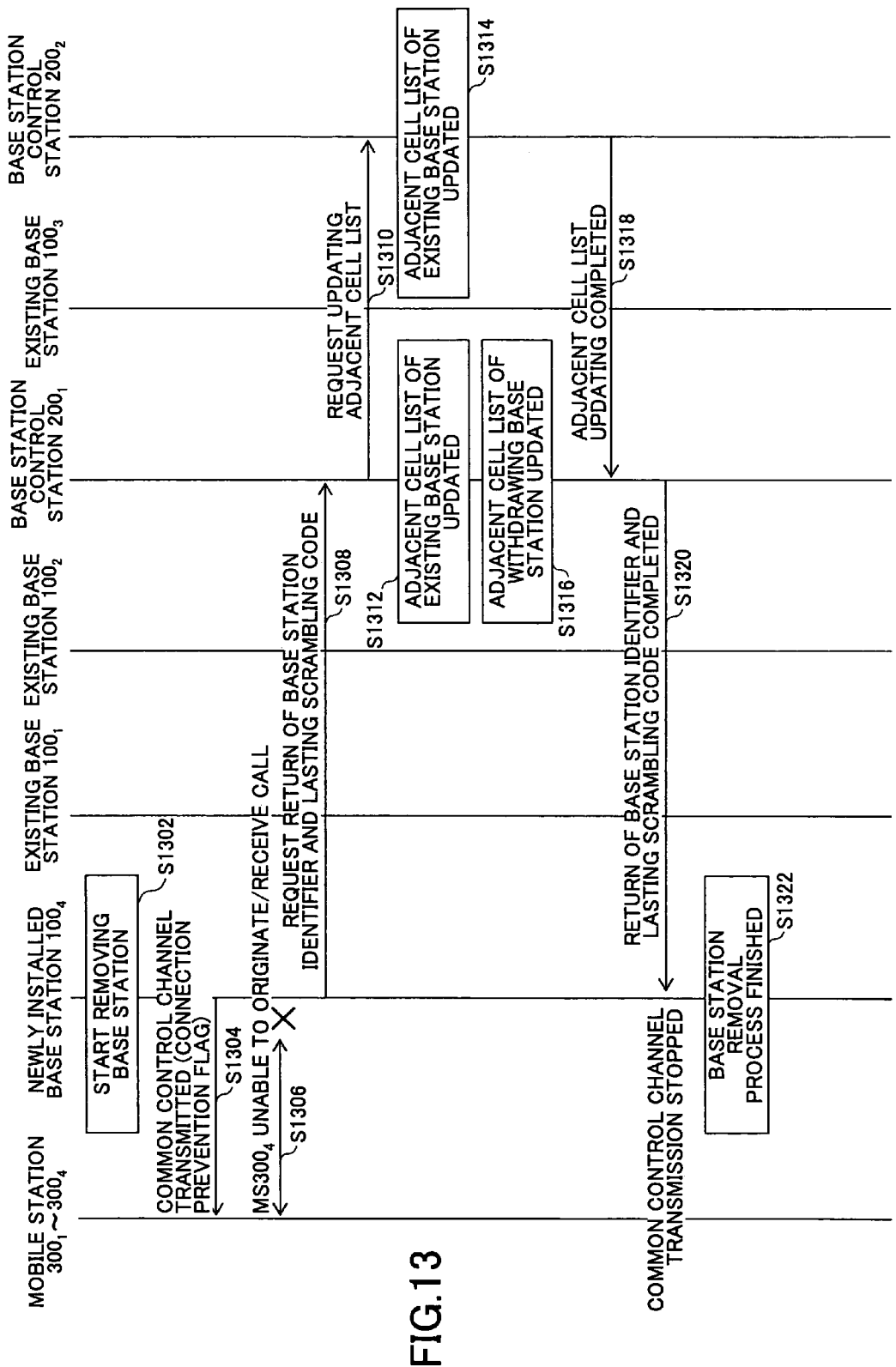
FIG. 13 is a sequence diagram showing a process for removing the base station.

A base station removing process is described with reference to FIG. 13 that shows signal exchanges carried out by the network components.

When the base station removing process is started at the withdrawing base station $100_4$ (Step S1302), the connection prevention flag is first set in the common control channel (Step S1304), and a new connection with a mobile station is prevented (Step S1306). For example, connection of the mobile station $300_4$ ($MS300_4$ in FIG. 13) belonging to the cell of the withdrawing base station $100_4$ is prevented.

The withdrawing base station $100_4$ waits for the end of communications with the mobile station, and sends a request to return the base station identifier and the lasting scrambling code to the base station control station $200_1$ (Step S1308). The base station control station $200_1$ requests a base station control station, for example, the base station control station $200_2$ that accommodates base stations that are listed in the adjacent cell list of the withdrawing base station $100_4$ to remove the information (Sc and BSID) of the withdrawing base station $100_4$ from the adjacent cell lists of the listed base stations, and to update the adjacent cell lists (Step S1310). The base station control station $200_2$ deletes the information of the withdrawing base station $100_4$ from the adjacent cell list, and updates the adjacent cell list (Step S1314). Next, the base station control station $200_2$ notifies the base station control station $200_1$ to the effect that the adjacent cell list is updated (Step S1318).

Figure 14:
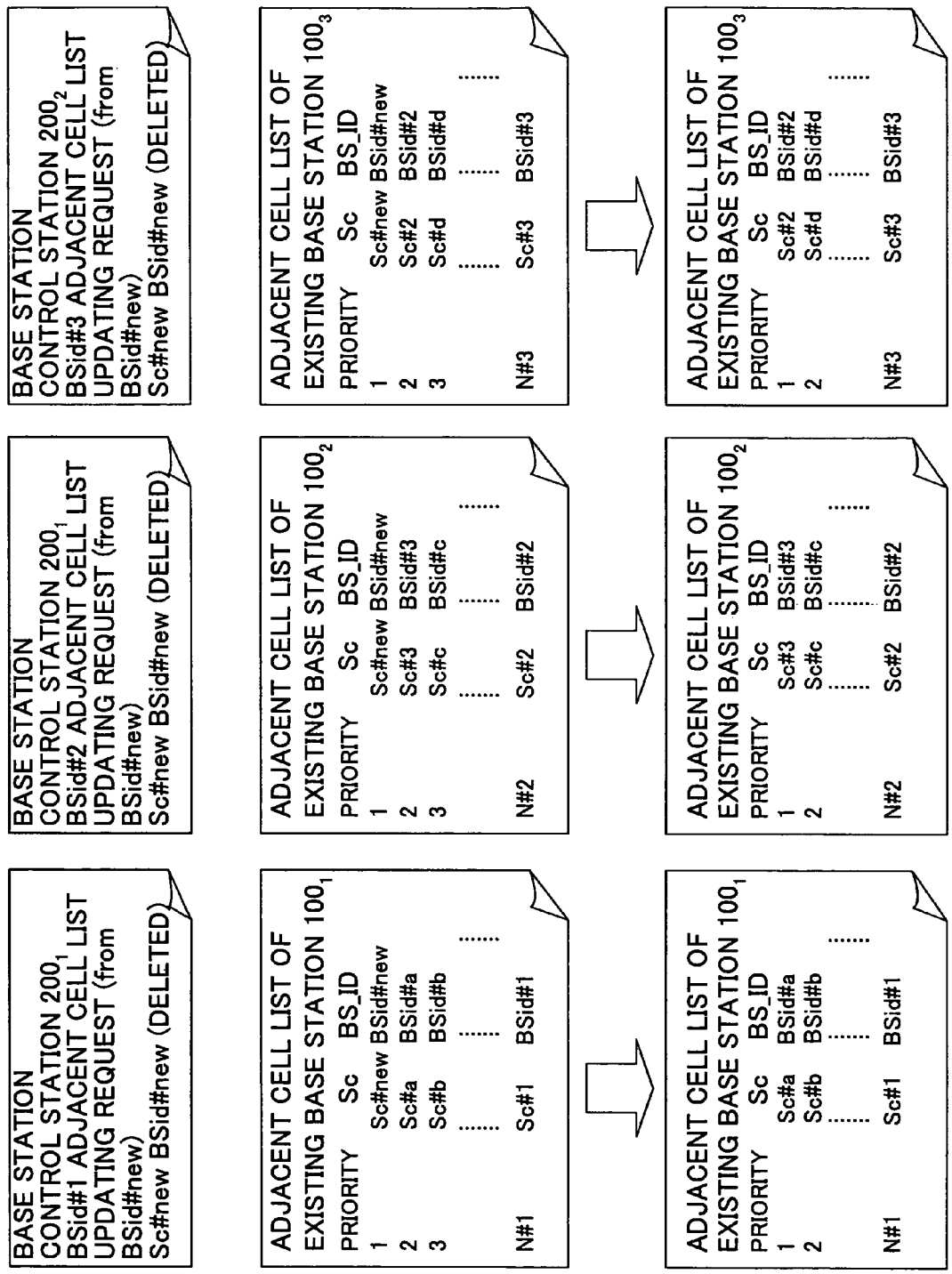
FIG. 14 is a sequence diagram showing information transmitted to the base station control station that accommodates removing a base station.

On the other hand, the base station control station $200_1$ deletes the information of the withdrawing base station $100_4$ from the adjacent cell list, and updates the list (Step S1312). Next, the base station control station $200_1$ deletes the adjacent cell list of the withdrawing base station from the base station control station $200_1$ (Step S1316). FIG. 14 shows transitions when the information of the withdrawing base station is deleted from the adjacent cell list.

When the adjacent cell list is updated, the base station control station $200_1$ that accommodates the withdrawing base station $100_4$ notifies the withdrawing base station $100_4$ that the base station identifier and the lasting scrambling code have been returned, and stops the common control channel (Step S1320).

After the withdrawing base station $100_4$ finishes other processes, the power supply is turned off and the base station removing process is completed (Step S1322).

The embodiment is described above with the case where a base station control station is provided at the higher order of the base stations; nevertheless, the functions of the base station control station may be distributed to and performed by the base stations, dispensing with the base station control station.

Further, according to the embodiment described above, a provisional scrambling code is assigned to a newly installed base station before assigning a lasting scrambling code, and mobile stations of adjacent cells send measurement results as a usual course of action, the results representing neighbor relations between the cells and being collected by a base station control station. Furthermore, the adjacent cell list of a base station is automatically generated, and the adjacent cell lists of adjacent base stations are automatically updated. That is, since the usual measurement report from the mobile station is used when automatically assigning a downlink scrambling code, the base station is not required to identify a control channel of the downlink circuit transmitted from an adjacent base station, which is required by the conventional method. Accordingly, the scale of the base station, software, and the antenna need not be increased.

Further, since the adjacent cell list is taken into consideration when assigning the lasting scrambling code, the probability of the same scrambling code being used by base stations within a short distance can be reduced, so as to prevent interference from arising. Further, since the adjacent cell list is generated simultaneously with assignment of the scrambling code, the mobile station can swiftly detect a cell, thereby being able to raise the communication quality at the time of handover, decrease interference, and increase the system capacity.

Further, when a base station is removed, its scrambling code is returned, and the information of the withdrawing base station is deleted from the adjacent cell list of the adjacent base stations. Accordingly, the scrambling code becomes available for assigning for effective use, and the swiftness of cell detection by a mobile station can be maintained.

Further, since the scrambling code and the adjacent cell list are automatically set up based on the measurement reports provided by the mobile stations reflecting actual service situations, there is no necessity for the radio network designer to perform a computer simulation, nor to manually set up the scrambling code. Further, an error in estimating signal strength, which is associated with the computer simulation, is not a concern. Accordingly, the time, the computer resources, etc., required for designing are sharply reduced, and an efficient scrambling code assignment method and system are realized.

AVAILABILITY ON INDUSTRY

The base station and the scrambling code setting method according to the present invention are applicable to a CDMA cellular system wherein the same frequency band is shared among users with a code division multiple access method.

Further, the present invention is not limited to these embodiments, but variations and modifications may be made without departing from the scope of the present invention.

The present application is based on Japanese Priority Application No. 2004-329360 filed on Nov. 12, 2004 with the Japanese Patent Office, the entire contents of which are hereby incorporated by reference.

What is claimed is:

1. A base station of a mobile communications system wherein a plurality of mobile stations that belong to adjacent cells and base stations that form the adjacent cells communicate by sharing a common frequency band, comprising:
    a receiving unit for receiving a base station identifier and a provisional downlink scrambling code that has been provisionally assigned, said base station identifier and provisional downlink scrambling code being sent from a base station control station;
    a scrambling code setting unit for setting up said received base station identifier and said received provisional downlink scrambling code; and
    a transmitting unit for spectrum-spreading the base station identifier by the provisional downlink scrambling code, and for transmitting the base station identifier;
    wherein the scrambling code setting unit assigns a lasting downlink scrambling code based on a reception report, and
    the reception report being transmitted by one of a plurality of mobile stations to an adjacent base station, the plurality of mobile stations belonging to a cell formed by the adjacent base station that is adjacent to the base station, the reception report being based on a reception of the provisional downlink scrambling code and the base station identifier, and
    the scrambling code setting unit assigns the lasting downlink scrambling code not only based on (i) the adjacent cell list of the base station showing a scrambling code of one of the adjacent base stations, but also based on (ii) adjacent cell lists of the adjacent base stations showing scrambling codes of remote base stations that are adjacent to said adjacent base station of the base station;
    wherein the scrambling code setting unit sets the lasting downlink scrambling code that is not a duplicate of any scrambling code used in the adjacent cell list of the base station, and in the adjacent cell lists of base stations that are adjacent to said base station.

2. The base station as claimed in claim 1, wherein the transmitting unit transmits a flag for preventing a mobile station from connecting to the base station while the provisional downlink scrambling code is set.

3. The base station as claimed in claim 1, comprising:
an adjacent cell list updating unit for updating the adjacent cell list.

4. The base station as claimed in claim 3, wherein
when the base station is to be removed, the scrambling code setting unit returns the downlink scrambling code and the base station identifier, and
the adjacent cell list updating unit updates the adjacent cell list based on the return of the downlink scrambling code.

5. A scrambling code setting method of a mobile communications system wherein a plurality of mobile stations that belong to adjacent cells and base stations that form the adjacent cells communicate by sharing a common frequency band, comprising:
a step of receiving a base station identifier and a provisional downlink scrambling code that has been provisionally assigned, said base station identifier and provisional downlink scrambling code being sent from a base station control station to a base station;
a step of setting up said received base station identifier and said received provisional downlink scrambling code;
a step of transmitting the base station identifier that is spectrum-spread by the provisional downlink scrambling code;
a step of transmitting a reception report by one of a plurality of mobile stations to an adjacent base station, the plurality of mobile stations belonging to a cell formed by the adjacent base station that is adjacent to the base station, the reception report based on a reception of the provisionally downlink scrambling code and the base station identifier;
a step of assigning a lasting downlink scrambling code based on the reception report, based on not only (i) the adjacent cell list of the base station showing a scrambling code of one of the adjacent base stations, but also based on (ii) adjacent cell lists of the adjacent base stations showing scrambling codes of remote base stations that are adjacent to said adjacent base station of the base; and
a step of setting up the assigned scrambling code;
wherein the step of assigning the lasting downlink scrambling code sets the lasting downlink scrambling code that is not a duplicate of any scrambling code used in the adjacent cell list of the base station, and in the adjacent cell lists of base stations that are adjacent to said base station.

* * * * *